Patented July 15, 1952

2,603,574

UNITED STATES PATENT OFFICE 2,603,574

METHOD OF TREATING BRICK DURING CONSTRUCTION

Hoy M. Holmes, Charleston, W. Va.

No Drawing. Application October 5, 1949, Serial No. 119,749

1 Claim. (Cl. 117—6)

My invention relates to a preparation for use in connection with masonry surfaces, more especially a compound which forms a protective coating and yet is one which can very easily and quickly be removed by washing with water when the coating has served its purpose.

In construction work when the bricklayer has completed his job, it is usually either necessary or desirable to clean the faces of the bricks as very often there is a certain amount of the mortar or ingredients of the mortar deposited on some or all of the bricks. This cleaning is practically always done by using acid or acid preparations which obviously are objectionable or difficult to use.

With my invention, the brick faces are coated first or in the course of construction of the masonry wall. After the job of laying the bricks is completed, it is only necessary to wash the coating off with water as by a hose or the surface is first hosed with water, then lightly scrubbed with any ordinary brush while wet, and then rinsed off with more water.

My invention, by actual test, saves at least half the usual cost of cleaning the brickwork and about eighty percent of the time. The cleaning can be done about five times as fast with my invention than in any other manner. Furthermore, the job is nearly twice as clean as that accomplished by use of the usual acid method besides being entirely harmless to the user resulting in prevention of accidental injury which frequently happens with use of muriatic acid.

The formula of my preparation consists of isopropyl alcohol, methyl cellulose, polyvinyl alcohol, and water mixed in the following proportions by weight, which have been found to produce a most suitable preparation for a temporary coating for the purposes referred to above:

40 ounces isopropyl alcohol 99%
28 ounces water
1 ounce of water soluble methyl cellulose
2 grams of fairly high viscosity polyvinyl alcohol such as "Elvanol" 71-24 produced by E. I. du Pont de Nemours & Co. (Inc.)

The various ingredients given in the above example are mixed together sequentially while stirring or agitating to prevent the formation of lumps.

After the preparation has been thoroughly mixed it may be applied to the surface to be protected by brushing or spraying thereon and is subject to a minimum of draining.

While I have disclosed a formula for my preparation containing specific proportions for the ingredients, I do not propose to be limited thereto except as set forth in the appended claim.

What I claim is:

The method of treating bricks to prevent the necessity of acid to remove excess mortar after utilizing the bricks in construction, which comprises preparing a solution of 99% isopropyl alcohol, methyl cellulose, polyvinyl alcohol, and water in the following proportions by weight: 40 ozs. isopropyl alcohol, 28 ozs. water, 1 oz. water soluble methyl cellulose, 2 grams of fairly high viscosity polyvinyl alcohol, applying the prepared solution to the exposed face of masonry to be utilized in construction, and washing the solution and any accumulated foreign matter from the face of the masonry with water.

HOY M. HOLMES.

REFERENCES CITED

The following references are of record in the file of this patent:

UNITED STATES PATENTS

| Number | Name | Date |
|---|---|---|
| 2,162,618 | Izard | June 13, 1939 |
| 2,275,578 | Wood | Mar. 10, 1942 |
| 2,306,887 | Klose | Dec. 29, 1942 |
| 2,339,200 | Sowa | Jan. 11, 1944 |
| 2,340,311 | Donovan | Feb. 1, 1944 |